United States Patent [19]

Konno

[11] Patent Number: 4,572,636

[45] Date of Patent: Feb. 25, 1986

[54] MOTORIZED WINDING AND REWINDING CAMERA

[75] Inventor: Tatsuo Konno, Kanagawa, Japan

[73] Assignee: Canon Kabushiki Kaisha, Tokyo, Japan

[21] Appl. No.: 576,859

[22] Filed: Feb. 3, 1984

[30] Foreign Application Priority Data

Feb. 5, 1983 [JP] Japan ................................. 58-17767

[51] Int. Cl.⁴ .............................................. G03B 1/24
[52] U.S. Cl. ................................ 354/173.11; 354/213; 354/214
[58] Field of Search ................. 354/173.1, 173.11, 213, 354/214

[56] References Cited

U.S. PATENT DOCUMENTS 4,306,794 12/1981 Fukahori et al. .............. 354/173.11

Primary Examiner—L. T. Hix
Assistant Examiner—David M. Gray
Attorney, Agent, or Firm—Toren, McGeady, Stanger, Goldberg & Kiel

[57] ABSTRACT

A camera having a first driving torque transmission for film winding and a second driving torque transmission for film rewinding upon selective connection of the output shaft of an electric motor to automatically perform winding and rewinding. A display representing whether or not the transportation of the film by the motor is in progress is presented in either of the winding and rewinding modes, wherein use is made of two different film transportation detecting mechanisms for the winding and rewinding modes respectively.

7 Claims, 6 Drawing Figures

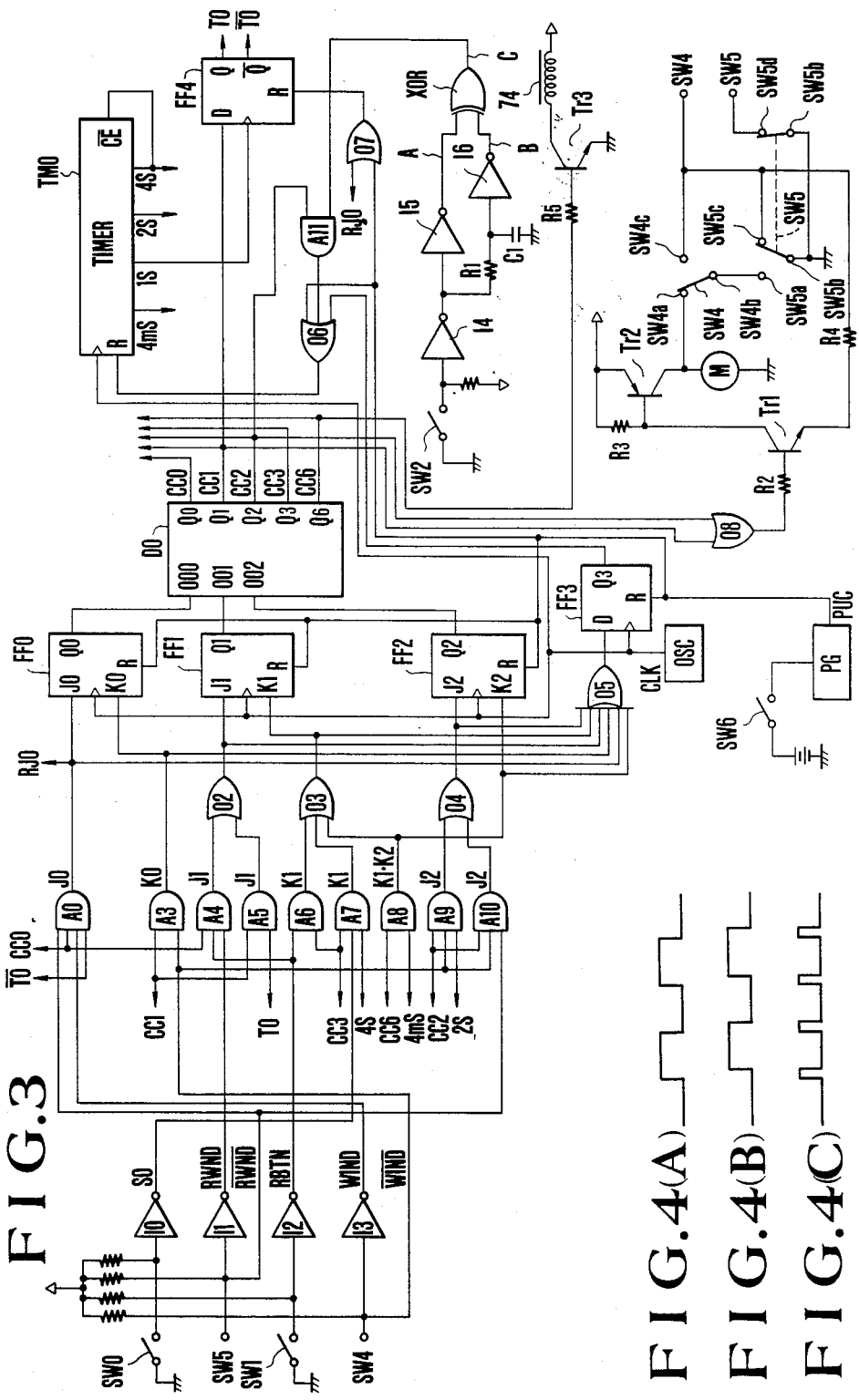
F I G. 3
F I G. 4(A)
F I G. 4(B)
F I G. 4(C)

MOTORIZED WINDING AND REWINDING CAMERA

BACKGROUND OF THE INVENTION

1. Field of the Invention

This invention relates to motorized cameras wherein the winding and rewinding of film are performed by a built-in electric motor.

More particularly it relates to a camera capable of displaying the fact that winding or rewinding of the film is in progress.

2. Description of the Prior Art

Recently, particularly in the field of leaf shutter type (medium priced) cameras, a tendency toward full automation thereof has developed and this trend is spreading to the field of single lens reflex cameras. The term "full automation" herein used implies that as is well known, not only the exposure operation as a matter of course, but all other operations including film winding and focusing, and film rewinding at the film end, are automatically carried out by the electric motor incorporated in the camera housing, thus freeing the photographer from the distraction of carrying out a troublesome sequence of operations. This tends to improve the quality of photographs for all levels of photographer capabilities.

Such automatization, however, gives the rise to another aspect in that a new capability which has been unnecessary to the manually-operated camera becomes necessary to provide. For example, when it is desired to ensure that the film is normally advanced by the rapid-winding lever, it is usually sufficient to be aware of whether the rewind knob rotates suffices. Also when rewinding, the operator needs to operate the rewind crank manually. Therefore, it was easy for the operator to ascertain that normal film rewinding is in operation and to detect when the film is fully rewound. However since motorized winding and rewinding naturally makes the rewind knob or crank unnecessary, means indicating a the proof on the normal film transporting condition is no longer available. Therefore, means must be provided for observing how the film is being transported. In addition thereto, from the standpoint of providing full automatization including in a true sense, there is also the need to provide means for stopping the rewinding operation automatically when the film is fully rewound on the supply reel.

SUMMARY OF THE INVENTION

With the foregoing in mind, it is a general object of the present invention to provide a motorized winding and rewinding camera having the capabilities of displaying the film transporting state accurately in both the winding and rewinding modes and of terminating the rewinding operation in automatic response to completion of rewinding of the film.

Other objects of the present invention will become apparent from the following description of an embodiment thereof.

BRIEF DESCRIPTION OF THE DRAWINGS

FIG. 3 is an electrical circuit diagram of a circuit for controlling the motorized winding and rewinding operations.

FIGS. 4(a), 4(b) and 4(c) are waveforms of signals appearing in the circuit of FIG. 3.

DETAILED DESCRIPTION OF THE PREFERRED EMBODIMENTS

Figure 1:
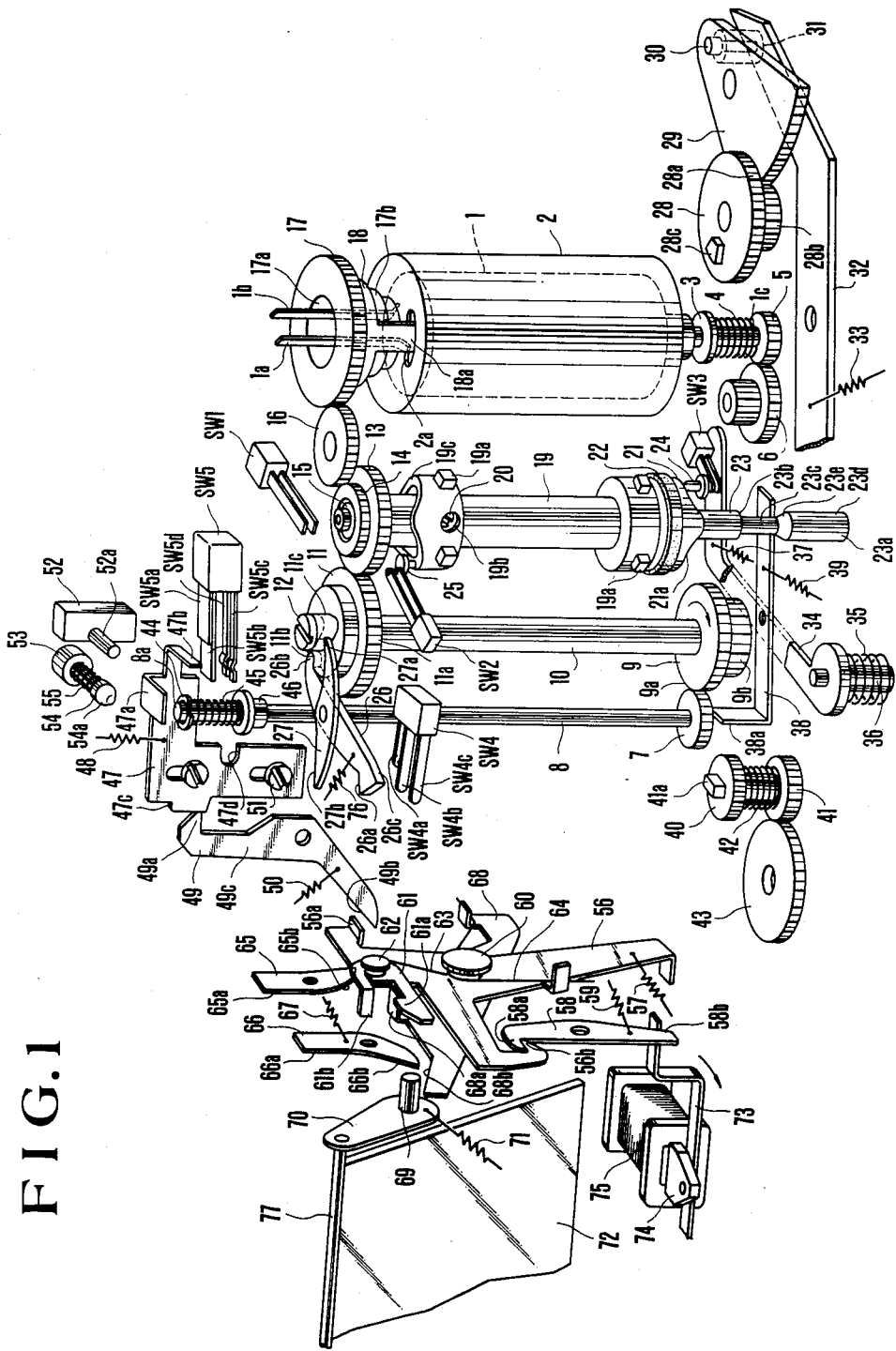
FIG. 1 is an exploded perspective view of an embodiment of motorized winding and rewinding mechanisms according to the present invention.

In FIG. 1 there are shown interior mechanisms of the motorized winding and rewinding camera wherein 1 is an electric motor operating as a drive source for charging all portions of the camera, such as the film transportation mechanism, shutter and mirror. The motor 1 has electrical energy receiving terminals 1a and 1b, fixedly mounted on a base plate (not shown), and is contained within a film take-up spool 2. The film take-up spool 2 is rotatably supported by the base plate and has a hole 2a in which is engaged a leg 18a of a spool friction spring 18. A pinion 5 is rotatably mounted on an output shaft of motor 1. By a slip mechanism comprising a coil spring 4 and a collar 3, the driving torque of motor 1 being normally transmitted to the pinion 5. A speed reduction gear train has a first gear 6 meshing with the pinion 5 and a last gear 7 which is arranged to mesh with a gear assembly 9 at a larger gear 9a when in the winding mode, and to mesh with an absorption gear 40 when in the rewinding mode. The winding gear assembly 9 has another or smaller gear 9b meshing with a larger gear 28a of another gear assembly 28, and is fixed to a winding shaft 10. A one-frame indexing member 11 comprises a gear 11a meshing with a gear 13, a detent slot 11b cooperative with a pawl 26b of an arresting lever 26, and a camming portion 11c engageable with one end of a mirror release lever 27, and is fixedly secured to the winding shaft 10 by a screw fastener 12.

The aforesaid gear 13 is arranged to rotate as a unit with a sprocket shaft 23. A gear 14 is rotatably mounted on the sprocket gear 23 and constitutes along with a frictional disc 15 fixedly mounted on the top end of sprocket shaft 23, a clutch mechanism for estabilishing and cutting off transmission of motion of the sprocket shaft 23 to and from an idler gear 16. A spool gear 17 meshes with the idler gear 16 and is rotatably supported through a hollow shaft 80 fitted in a central hole 17a thereof. On the outer surface of a diameter-reduced portion 17b thereof is convoluted the spring 18. That is the spool gear 17, spool friction spring 18 and film take-up spool 2 constitute a slip mechanism known to those skilled in the art operating when in the winding mode.

Figure 2:
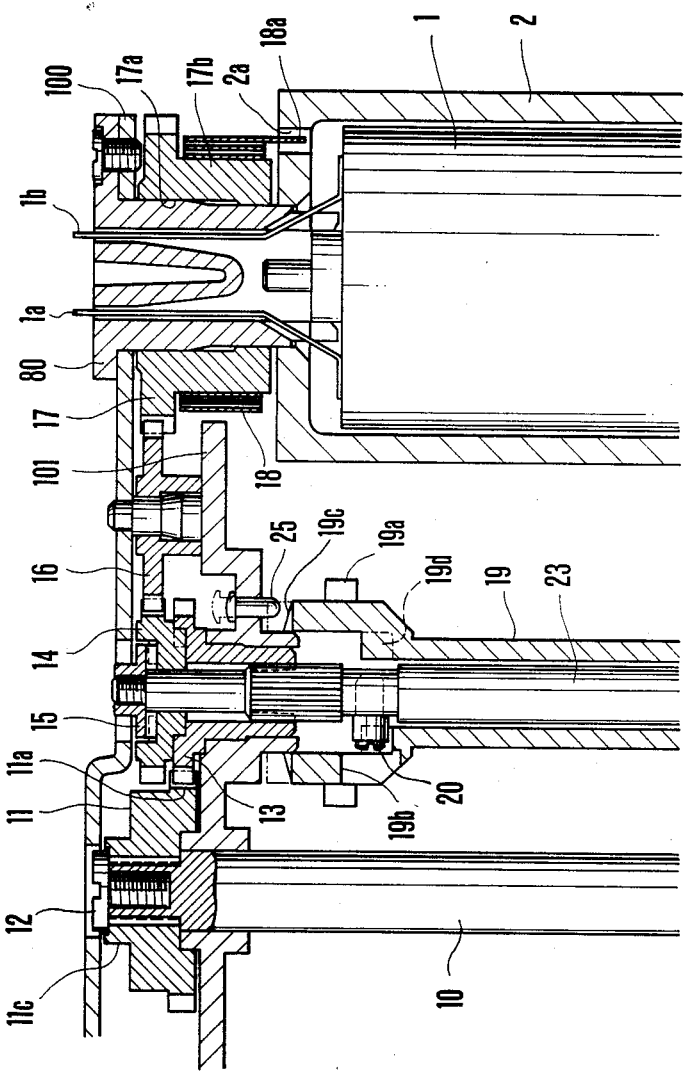
FIG. 2 is a sectional view of the main part of FIG. 1.

A sprocket 19 has teeth 19a engaging perforations of a film strip, and an escape hole 19b for a clutch screw 20, and is provided with a groove 19d (FIG. 2) engageable with said clutch screw 20. The parts 19b, 19d and 20 constitute a known cluth mechanism for establishing or cutting off transmission of rotation of said sprocket shaft 23 to and from the sprocket 19 as the sprocket shaft 23 moves upward or downward. The upper edge of the sprocket 19 is formed as a wavy camming surface 19c on which a cam follower pin 25 rides. A roller 21 fixedly carries a rubber ring 22 on the outer peripheral surface thereof and has its lower edge formed as a wavy camming surface 21a similar to the camming surface 19c. On the camming surface 21a rides a cam follower pin 24. The roller 21 is rotatably supported on the base plate and is driven to rotate by the transporting film as it is pressed against the rubber ring 22, so that the roller 21 rotates only when the film is being transported.

The aforesaid sprocket shaft 23 is always urged downward by a coil spring (not shown), and is vertically slidable. When a rewind control knob contiguous to the shaft 23 is pushed upward, a lock lever 34 enters a radial recess 23b to hold the sprocket shaft 23 in the pushed position, and at the same time, the clutch screw 20 moves upward away from the groove 19d, whereby the clutch mechanism is operated to leave the sprocket 19 freely rotatable. Further the clutch member 15 is also lifted upward, whereby the motion transmission to the idler gear 16 is cut off, and a switch SW1 is closed.

The cam follower 24 is supported on the base plate to be vertically slidable and abuts on the camming surface 21a so that as the roller rotates, the cam follower pin 24 reciprocates vertically, causing a switch SW3 to repeat cycles of opening and closing operation.

The second cam follower pin 25 is also supported on the base plate to be vertically slidable and abuts on the camming surface 19c of the sprocket 19, so that as the sprocket 19 rotates, the pin 25 reciprocates vertically, causing another switch SW2 to repeat cycles of opening and closing operation.

The winding stop lever 26 has a portion 26a for engagement with one end 66a of a lever 66, another portion 26b for engagement with the detent slot 11b of the gear 11a, and still another portion 26c for engagement with a movable contact SW4b of a switch SW, and is urged by a spring 76 to turn clockwise as viewed in FIG. 1. Since the winding stop gear 11a rotates 360° for each film frame, the film is admitted to advance through the prescribed length of one frame each time the pawl 26b is retracted from and then enters into the detent slot 11b.

A mirror release signal lever 27 is abuttingly engageable at its one end 27a with the cam 11c and at the opposite end thereof with one end 6a of a lever 65. In the early stage of winding operation, or just after the gear 11a starts to rotate clockwise, the cam 11c turns the mirror release signal lever 27 clockwise, until its tail 27b strikes the lever 65 at one end 65a thereof.

A gear 28 comprises a large geared portion 28a meshing with the small geared portion 9b of the winding gear 9 and a small geared portion 28b meshing with a sector gear 29 so that when the winding gear 9 has rotated 360°, the sector gear 29 is charged by a prescribed angle. Then, because a few teeth of the large geared portion of the aforesaid winding gear 9 are cut out, the meshing relation is broken and the sector gear 29 returns to its initial position when a charge lever 32 to be described hereinafter turns counterclockwise to regain its initial position. Also since the gear 28 has a protuberance 28c on the upper surface thereof at such a location that when the sprocket shaft 23 is pushed upward, the lock lever 34 is moved away from the radial recess 23c as the gear 28 returns to the initial position. Thus, the rewind control knob 23a is released from the advanced position.

The sector gear 29 fixedly carries a post 30 on which is rotatably mounted a roller 31. The charge lever 32 is urged by a spring 33 to turn counterclockwise and always abuts on the charge roller 31, so that when the sector gear 29 turns, the charge lever 32 is turned a prescribed angle. During this time, a charge system on a front panel (not shown) is charged by an oppisite end (not shown) of the charge lever 32. After that, it returns to the initial position.

The lock lever 34 is rotatably mounted on a shaft 36, and is supported to be vertically slidable. A coil spring 35 urges the lock lever 34 upward, and another spring 37 urges it to turn clockwise. And, in a normal position (illustrated position), the lock lever 34 is so high as to lie out of the path of the protuberance 28c of the gear 28. But when the sprocket shaft 23 is lifted upward, and the shoulder 23b is overlaid on the lock lever 34, the result is that because a spring (not shown) urging the sprocket shaft 23 downward is stronger than the coil spring 35, the lock lever 34 is moved downward against the spring 35 to a position low enough as to be engageable with the protuberance 28c.

A lever 38 is urged by a spring 39 clockwise to abut with its one end on the diameter-reduced portion 23c of the sprocket shaft 23, and has its opposite end bent off upward to bar the changeover gear 7 from moving downward. When the above-described sprocket shaft 23 is pushed upward, as the diameter-reduced portion 23 moves away from the lever 38 and a tapered surface 23e followed by a large diameter portion 23d moves in, the lever 38 turns counterclockwise and its upward extension 38a moves away from the path of movement of the changeover gear 7.

The absorption gear 40 is non-rotatably but axially slidably mounted on a shaft 41a of a gear 41 and is urged by a spring 42 upward. When in a winding position (illustrated position), this absorption gear 40 does not mesh with any gear. But when switched to the rewinding mode, the changeover gear 7 is brought into engagement with the absorption gear 40 so that motion of gear 40 is transmitted to a first gear 43 of a rewinding gear train. A changeover shaft 8 is rotatably and slidably supported by a bearing 46 fixedly secured to a camera housing (not shown) and is urged by a spring 45 reacting with a retainer 44 to move upward.

A slider plate 47 is vertically movably mounted on a base plate (not shown) by stepped screw fasteners 51, and is urged by a spring 48 upward. When in the rewinding mode, the slider plate 47 has a bent portion 47a contacting with a head 8a of the aforesaid changeover shaft 8, another bent portion 47b acting on a movable contact SW5b of a siwtch SW5, an extension 47c engaging with a pawl 49a of a latch lever 49, and a cutout 47d accepting a pin 52a of an operating knob 52 accessible from the outside of the camera when switching to the rewinding mode is performed.

The latch lever 49 is urged by a spring 50 to turn clockwise and has a portion 49a for catching the slide plate 47, another portion 49b for engagement with a bent portion 56a of a mirror drive lever 56, and still another portion 49c for engagement with a cone dowel 54. The cone dowel 54 is threadedly mounted on an external actuator button 53 for manually stopping the rewinding operation. When this actuator button 53 is pushed inward from the outside, the taper surface 54a of the cone dowel 54 acts on the side edge 49c of the latch lever 49 and then turns the latter counterclockwise, whereby the slide plate 47 is released from latching connection. A spring 55 urges the actuator button 53 to return to the initial position.

The mirror drive lever 56 has a bent portion 56a for engagement with the one end 49b of the latch lever 49, and a pawl 56b for engagement with a pawl of a lever 58, and is urged by a drive spring 57 to turn about a shaft 60 clockwise. A lever 61 is rotatably mounted at a shaft 62 on the mirror drive lever 56, and is urged by a spring 63 to turn clockwise. The lever 61 has a pawl 61a for engagement with the pawl 68a of the mirror control lever 68 and an extension 61b engageable with one end 65a of a lever 65. The mirror control lever 68 is rotatably mounted on the common shaft 60 of the mirror drive lever 56 and is urged by a spring 64 to turn counterclockwise relative to the mirror drive lever 56. The mirror control lever 68 has a portion 68b bearing a stud bolt 69 on the free end of a lever 70 with a shaft as a journal 77 for the mirror 72, so that when the lever 68 turns clockwise, the lever 70 is turned about the journal 77 against a spring 71 to move the mirror 72 to a prescribed non-viewing position. Such clockwise movement of mirror control lever 68 also causes a lever 66 to be turned counterclockwise against a spring 67 with an end 66a thereof engaging with the portion 68b, which in turn causes counterclockwise movement of the winding stop lever 26 to disengage its pawl 26b from the detent recess 11b.

The lever 59 is urged by a spring 58 counterclockwise to abut with its tail 58b on a free end of a lever 73. Mounted on the lever 73 is an armature 74 cooperating with an electromagnet 75 of PM type. When a solenoid of the magnet 75 is supplied with current in response to actuation of a camera release, the armature 74 is moved away from the magnet 75. The mirror 72 is a known reflection mirror, in a viewing position, for directing the light coming from the objective lens to a finder optical system. When it is desired to make an exposure, the mirror 72 is flipped upward about the shaft 77 to clear the light path to the film. In order to describe the embodiment of the invention and its mechanical features and operation, the mechanisms of FIG. 1 are assumed to be in the cocked position. When a camera release is actuated, the magnet 75 is first energized to release the armature 74 from attraction. The lever 73 is then turned in a direction indicated by the arrow by the bias force of a spring (not shown), whereby the lever 58 is turned clockwise against the spring 59. Therefore, the latch pawl 58a disengages from the mirror drive lever 56, permitting the latter to turn clockwise by the force of the power storage spring 57. Since, at this time, the mirror control lever 68 is in operative connection with the mirror drive lever 56 by the lever 61, the mirror control lever 68 as a unit with the mirror drive lever 56 turns in the same direction. Therefore, the mirror arm 70 is turned counterclockwise, moving upward the mirror 72 from the viewing to the non-viewing position. Such clockwise movement of the mirror drive lever 68 also causes counterclockwise movement of the lever 66 against the spring 67 which in turn causes counterclockwise movement of the winding stop lever 26. Thus, the film advance control gear 11 is released from locking connection.

Responsive to this release operation, the switch contact SW4b is taken out of engagement with another contact SW4a and is broguht into engagement with a third contact SW4c. This is followed by a shutter operation.

When an exposure is completed, the motor 1 is supplied with current and starts to rotate. Motion of the motor 1 is transmitted through the pinion 5 and the reduction gear train of the first gear 6 and the last gear 7 to the winding gear 9, and therefrom transmitted to both of the winding stop gear 11 and gear 28. Rotation of the winding stop gear 11 is transmitted through the gear 13 to drive rotation of sprocket 19 and also to the gear 14 of which rotation is transmitted through the gear 16 and spool gear 17 to drive rotation of the film take-up spool 2. Thereby the film is advanced through the prescribed length of one frame. It is during this time that the rubber ring 22 frictionally contacting with the film rotates the roller 21 so that the switch SW3 is turned on and off repeatedly by the actuator in the form of the cam follower pin 24 engaging on the wavy camming surface 21a. The output signal of the switch SW3 is applied to a display either in the field of view of the finder, or on the camera housing, informing the photographer of the fact that the film is in progress.

Also in the early stage of one revolution of the gear 11, the cam 11c turns the mirror release lever 27 clockwise until its opposite arm 27b strikes the lever 65 at the head 65a thereof. Then the lever 65 turns clockwise, causing the drive connection lever 61 to turn counterclockwise against the spring 63 until its pawl 61a disengages from the extension 68a of the mirror control lever 68. Then the lever 68 is turned counterclockwise by the force of the spring 64, allowing the mirror 72 to return to the initial or viewing position.

On the other hand, rotation of gear 28 is transmitted through the sector gear 29 to turn the charge lever 32 clockwise through a predetermined angle against the spring 33, whereby those of the mechanisms which lie on the front side of the base plate, for example, a mirror quick return, AE, automatic diaphragm, are charged. As the winding operation goes on, when the gear 9 has rotated one revolution or 360°, the detent slot 11b comes into alignment with the pawl 26b of the winding stop lever 26. Then, as the pawl 26b drops into the slot 11b the winding stop lever 26 turns clockwise, whereby the movable contact SW4b is moved from its SW4c to its SW4a position where the motor 1 is stopped. Thus, the winding operation is terminated, and the mechanisms regain the illustrated positions.

When such operation has been recyled a number of times, for example, 36 times, no more fresh area of the film is available. In the last cycle of winding operation, it is rare that the illustrated or fully wound-up position is reached, but it often results that a film resistance takes place, and therefore that the winding charge system all stops on the way before the illustrated position is reached. Also at this time the slip mechanism comprising the retainer 3, spring 4 and gear 5 allows the motor 1 alone to continue rotating. On this account, a current supply control circuit for the motor 1 is so constructed that an occurrence of the film resistance is detected when the movable contact SW4b remains in contact with the SW4c for a prescribed time, for example, 1 second after the initiation of current supply to the motor 1. By this means the motor 1 is soon stopped automatically.

During a rewinding operation, the operator will first push the exterior portion, or rewind control knob, of the sprocket shaft 23. Then the lock lever 34 catches the shoulder 23b and holds the sprocket shaft 23 in the lifted position. It is in this position that as has been described before, the first clutch comprising the screw 20 and groove 19d in the interior of the sprocket 19 and the second clutch of the gear 14 and member 15 are cut off, leaving the sprocket 19 and film take-up spool 2 freely rotatable.

Such upward movement of the sprocket shaft 23 also causes closure of the switch SW1. If, at this time, the camera is not in completion of the last cycle of winding operation, it results that because the contacts SW4b and SW4c are ON, on the basis of this signal, the current supply to the motor 1 is caused to proceed by the closure of the aforesaid switch SW1 until the winding charge system and the front charge system are reset in the illustrated positions.

By the upward movement of the sprocket shaft 23, the lock lever 38 is turned counterclockwise against the spring 39 to move away from the path of movement of the changeover gear 7. Subsequent to the first touch of pushing the sprocket shaft 23 upward, the operator will then push down the rewind changeover knob 52, whereby the slide plate 47 is moved downward against the spring 48 along with the changeover shaft 8. Such movement of the slide plate 47 causes the movable contact SW5b to be taken out of engagement with the contact SW5a and to be brought into engagement with both of the contacts SW5c and SW5d. The latch lever 49 then holds the slide plate 47 in that operative position. It is in this position that the changeover gear 7 is out of mesh with the winding gear 9 but in mesh with the absorption gear 40 so that rotation is directed to the first gear 43 of the rewinding gear train.

When the contact SW5b moves from the SW5a to SW5c (SW5d) position, the motor 1 starts to rotate. Motion of the motor 1 is transmitted through the above-described reduction gear train and changeover gear 7 to the rewinding gear train, initiating a rewinding operation. As the film is moving backward while its perforations engaging the sprocket teeth 19a the sprocket 19 is caused to rotate simultaneously. Therefore, the pin 25 moves up and down along the camming surface 19c, by which the switch SW2 is opened and closed repeatedly. Responsive to this output signal of switch SW2, the above-described display device either inside of the finder or exterior of the camera housing will be blinking so that the photographer is aware of the running condition of the film when in the rewinding mode.

When the film is moved away from the sprocket 19, the latter no longer rotates and the display device stops presentation of the information. Responsive to an electrical signal representing the termination of this opening and closing operation, (as detected, for example, by a timer TM0 to be described later cooperating with an AND gate A11, or by an excess of a prescribed time for stoppage of the output of A11 from further change), the current supply control circuit energizes the magnet 75 to release the armature 74 from the locking connection therewith. Therefore, as has been described above, the spring-powered lever 56 turns clockwise until its extension 56a strikes the second latch lever 49 at its tail 49b. Then the lever 49 is turned counterclockwise against the spring 50, whereby the slide plate 47 is released from the latched position and is moved upward to the initial position by the force of the spring 48. As the changeover shaft 8 follows up the slide plate 47 under the action of the spring 45, the changeover gear 7 after having been taken out of mesh with the absorption gear 40 is brought into mesh with the winding gear 9 as illustrated in FIG. 1.

Such clockwise movement of the spring-powered lever 56 also causes, as has been described above, counterclockwise movement of the lever 66 which in turn causes removal of the winding stop lever 26 from the detent slot 11b and switching of the contact SW4b to the SW4c position. Since, at this time, the switch SW5 is in its SW5c (SW5d) position, the camera is wound up one cycle in vain. It is by this preliminary winding operation that the sprocket shaft 23 is released from latching connection with the lock lever 34 by the charge lever 32 and returns to the initial position by the action of the coil spring (not shown).

Thus, rewinding of the film is automatically stopped, and the sprocket shaft 23 and the rewinding changeover member 52, or the two exterior rewind control members, are automatically reset. If the photographer desires to stop the rewinding operation on the way, for example, with the intention of leaving the film leader exposed out of the cartridge, he need only push the button 53. That is, upon depression of the button 53, the second latch lever 49 is turned counterclockwise by the tapered surface 54a engaging the portion 49c, and its pawl 49a is disengaged from the projection 47c, permitting the slide plate 47 to move upward to the initial position. Thus, the rewinding operation is stopped from further progress.

In FIG. 3 there is shown a control circuit of the above-described motorized winding and rewinding mechanisms where A0 to A10 are AND gates; 02 to 08 are OR gates; I0 to I6 are inverters; FF0 to FF4 are flip-flops; XOR is an exclusive OR gate; D0 is a decoder; TM0 is a timer; OSC is an oscillator; SW0, SW1, SW2 and SW6 are opening and closing switches; SW4 and SW5 are changeover switches.

When the battery switch SW6 is turned on, a pulse generator PG produces an output signal PUC which is applied to reset flip-flops FF0 to FF3, through OR gate 06 to reset timer TM0 and through OR gate 07 to reset flip-flop FF4, so that the outputs Q1 to Q3 of flip-flops FF0 to FF3 become 0. Then decoder D0 produces an output of "1" at a stage Q0 which represents a sequence CC0. The camera is now assumed to be in the fully cocked position so that switch SW4 takes its SW4a position, and to be switched to the rewinding mode so that the switch SW5 takes its SW5c and SW5d positions and the switch SW1 is ON. Then inverters I1 and I2 with their inputs grounded produce outputs of "1" or signals labelled "BWND" and "RBTN" respectively. Responsive to these signals in addition to the CC0, AND gate A4 changes its output J1 to "1" which is applied through OR gate 02 to an input J1 of flip-flop FF1. Since flipflops FF0 and FF2 have inputs J0 and J2 respectively which are "0", the output Q1 of flip-flop FF1 changes to "1" in synchronism with the rising edge of a clock pulse from oscillator OSC. As others retain the receding state, decoder D0 has its inputs in a binary coded form of [010], and produces a signal of "1" at the output Q2 thereof. That is, the sequence becomes CC2. The output "1" of OR gate 02 is also applied through OR gate 05 to an input D of flip-flop FF3, whereby the output Q3 of flip-flop FF3 is changed to "1". This output Q3 is applied through OR gate 06 to reset timer TM0. When the sequence changes from CC0 to CC2, the output of AND gate A4 becomes "0". Therefore, the outputs of OR gates 02 and 05 become "0", and the input D of flip-flop FF3 becomes "0". In synchronism with the rising edge of the next clock pulse CLK, the output Q3 changes to "0". Thus, the flip-flop FF3 produces one "reset" pulse of the same duration as one clock pulse each time the sequence changes. This "reset" pulse is applied through OR gate 06 to reset the timer TM0.

The output CC2 enables AND gates A9, A10 and A11, and is applied through OR gate 08 and resistor R2 to turn on transistors Tr1 and Tr2, whereby motor M is energized.

The camera starts to rewind the film and at the same time the timer TM0 starts to count time. As rewinding of the film goes on, when the sprocket 19 rotates, the switch SW2 is turned on and off by the actuator 25 operating on the camming surface 19c. Each time the switch SW2 transits either ON to OFF, or OFF to ON, one pulse of short duration as shown in FIG. 4(c) is produced from a pulse forming circuit comprising the inverters I4 to I6, exclusive OR gate XOR, capacitor C1 and resistor R1. This pulse is applied through AND gate A11 and OR gate 06 to reset the timer TM0. Therefore, an output 2S of the timer TM0 remains "0" so long as the transit of the switch SW2 takes place in less than two seconds. As the film rewinding nears the end, after the film moves away from the sprocket teeth 19a, the switch SW2 is left unchanged from ON or OFF position. In two seconds from the termination of the operation of the switch SW2, the timer TM0 changes its output 2S to "1", causing the output of AND gate A9 to change to "1". Therefore, the output of OR gate 04, accordingly, an input J2 of the flip-flop FF2 becomes "1". In synchronism with the rising edge of a clock pulse CLK, the output Q2 of flip-flop FF2 is then changed to "1". Since, at this time, the other flip-flops FF0 and FF1 have their inputs J0, K0, K1 and J1 at "0", and their respective outputs Q0 and Q1, therefore, unchanged from the preceding conditions, or "0" and "1" respectively, the inputs of the decoder D0 takes another binary form of [110]. Thus, the sequence advances to CC6 so that the transistors Tr1 and Tr2 turn off to deenergize the motor M, terminating the film winding operation.

Such cange of the sequence to CC6 also causes conduction of another transistor Tr3 which results in energization of the magnet 74. Then the mirror up mechanism operates to move the switch SW5 with its contact SW5b from the contacts SW5c and SW5d, but onto the opposite contact SW5a. Also as the mirror flips up, the switch SW4 is moved from its SW4a to its SW4c position.

In four seconds from the start of the sequence CC6, timer TM0 changes its output 4ms to "1", causing the outputs of AND gates A8 and OR gate 03 to change to "1" successively. Therefore, the inputs K1 and K2 of flip-flops FF1 and FF2 become "1". In synchronism with the rising edge of a clock pulse CLK, all the outputs of flip-flops FF0 to FF2 return to "0". Responsive to this, decoder D0 produces "1" at the output Q0. Thus, the sequence becomes CC0. Since, at this time, switch SW4 is ON, the output of inverter I3 is "1". Also since the switch SW5 is OFF, the signal RWND is "1". Also since flip-flop FF4 is in "reset" position, the output Q or signal TO is "1". Therefore, the output of AND gate A0 becomes "1", which is applied to the input J0 of flip-flop FF0. In synchronism with the rising edge of a clock pulse CLK, the flip-flop FF0 changes its output Q0 to "1". As the outputs of FF1 and FF2 are "0", the decoder D0 has its inputs in [001], and produces "1" at the output Q1 thereof, advancing the sequence to CC1. Thereby transistor Tr3 is turned off to deenergize the magnet 74. Such shift of the sequence also causes the output of OR gate 08 to change to "1". Because the SW5a and SW5b path and the SW4a and SW4b path are cut off, the transistors Tr1 and Tr2 are then turned on, to energize the motor M. Thus the camera starts to operate for one cycle of winding-in-vain operation.

When that cycle of winding operation is completed provided in, for example, one second, a subsequenct operation proceeds whereby at the termination of the winding operation, the contact SW4b is taken out of engagement with the contact SW4c, turning on with the opposite contact SW4a, whereby the transistors Tr1 and Tr2 are rendered nonconducting. Thus the motor M gets stopped, as the two ends of the winding of the motor M are short-circuited by grounding the contact SW4a through the contact SW4b and the switch SW5. Also at the same time when the winding operation is terminated, the latch mechanism of the sprocket shaft 23 is released and the switch SW1 is turned off. Thus, the camera regains the initial position. And, such disengagement of the contact SW4b from the contact SW4c causes change of the signal WIND to "1" and therefore causes change of the output of AND gate A3, or the input K0 of flip-flop FF0, to "1". In synchronism with the rising edge of a clock pulse CLK, the flip-flop FF0 then changes its output Q0 to "0". Because of the flip-flops FF1 and FF2 having the outputs Q1 and Q2 of "0", the decoder D0 has its inputs in the form of [000] and produces "1" at the output Q0. Thus, the sequence returns to CC0.

Now assuming that when the phase of sequence is CC1, in other words, when the camera operates in the winding mode, the cycle of winding operation fails to complete itself in less than one second.

Similarly to the above, shifting of the sequence to CC1 results in starting a motorized winding. At the same time, the timer TM0 starts to count clock pulses CLK. When one second has passed, the output 1S changes to "1". This output is applied to a "clock" terminal C of flip-flop FF4, causing the output Q of flip-flop FF4 to change to "1". Therefore, the output of AND gate A5 becomes "1", and the output of OR gate 02 becomes "1". Responsive to this, flip-flop FF1 changes its output Q1 to "1" in synchronism with the rising edge of a clock pulse. Also the flip-flop FF0 has the output Q0 of "1", and the flip-flop FF2 has the output Q2 of "0". Therefore, the decoder D0 changes its output Q3 to "1", thus shifting the sequence to CC3 representing the fact that the cycle of winding operation is unfinished and the film can be no longer be more fed.

As soon as the sequence has shifted to CC3, the photographer becoming aware of this situation may get a release of the latch mechanism by means of the sprocket shaft 23. When the switch SW1 is turned on, the output RBTN of inverter I2 changes to "1", and therefore, the outputs of AND gate A6 and OR gate 03 change to "1" successively. Responsive to this, flip-flop FF1 changes its output Q1 to "0" in synchronism with the rising edge of a clock pulse CLK. Thus, the sequence is shifted backward to CC1 by the decoder D0, permitting the above-described last cycle of winding operation to proceed to completeness.

If the photographer is not aware of that situation, it will result that when the sequence CC3 has taken four seconds to operate, the timer TM0 changes its output 4S to "1" which is applied to its CE terminal, so that the counting operation stops to maintain the output 4S at "1". After that, when the photographer comes to notice it, he then needs to turn on a light metering switch SW0 (not shown), whereby the output of inverter I0 is changed to "1", and therefore, the outputs of AND gate A7 and OR gate 03 are changed to "1". Thus the sequence is shifted backward to CC1, permitting the winding operation to proceed.

This phase of sequence is provided for the purpose of reducing the overheat of the motor resulting from the prolonged energization under heavy load and increasing the lifespan of the motor by creating a suspension of operation for a period, for example, four seconds as in the illustrated embodiment. Also the battery itself is allowed to rest with another advantage that the electrical energy can be saved to a considerable amount. Since the actual voltage of the battery, too, can recover, it is insured made sure that the subsequent winding operation can also proceed satisfactorily. This becomes of great imporatance particularly when the ambient temperature is very low.

Though, in the illustrated embodiment, the means for detecting when the film is fully rewound is made in the form using the sprocket 19, it is also possible to employ other methods, for example, by detecting rotation of the roller 21, or by using the timed relationship with the null-setting of the film frame counter, or by these methods in combination.

The displays for the condition of film transportation in the winding and rewinding modes may be presented either by a common display element with switching means, or by respective individual display elements operating independently of each other.

As has been described above, according to the present invention, the first film motion detecting means for presenting a display of the fact that the film rewinding is in progress is made to cooperate with the film feed control member with an advantage that even when a slack in the film is formed during transportation, it is able to detect when the film is being moved. Also the second detecting means for presenting another display of the fact that the film is being advanced is made to react to the film motion with another advantage of achieving presentation of the film motion display always with high reliability as such display will fail to present itself only when the film is not normally moved during automatic loading. It is also to be noted that the display of film motion during winding up can be used as a monitor display for examining whether the auto-loading of a film strip is going on successfully or unsuccessfully.

A further advantage of the invention arising from the arrangement of the first and second film motion detecting means is coaxial relation with the sprocket is that when in application even to single lens reflex cameras where because of their using the focal plane shutter, it is difficult to position the above-described detecting means near or at the film gate as in the leaf shutter type camera, a reliable display of film motion can be realized without involving any increase in the bulk and size of the camera.

Another feature of the invention is that the film motion detecting means is made to also serve as means for producing a signal representing the completion of film rewinding. By this, the limitation of the bulk and size of the camera to a minimum is preserved, and the production cost also is advantageously prevented from increasing. A further feature is that the signal representative of the film motion is produced in the form of a train of pulses, and the time interval between the successive two pulses is measured by a timer upon excess over a prescribed value to cut off the current supply to the motor. This produces an additional advantage that there is no possibility of occurrence of erroneous stoppage of the motor at a time during rewinding operation as the speed of film motion varies at random.

In the illustrated embodiment with any further alternation, it is also possible to provide a film frame counter operating in the up mode for winding and in the down mode for rewinding with the help of the exterior display or the interior display in the finder when the number of pulses from the film motion sensing means are counted.

Also according to the principles of the invention, without having to use light emitting elements or sensors or other equivalent optical elements, assurance that the condition of film motion is reliably displayed and an automatic termination of the rewinding operation is accurately controlled can be achieved, while still permitting the system to be constructed in a simple form.

While a specific embodiment of the invention has been shown and described in detail to illustrate the application of the inventive principles, it will be understood that the invention may be embodied otherwise without departing from such principles.

What I claim:

1. A motorized winding and rewinding camera comprising:
   (a) winding means having a driving torque transmitting system for winding up a film including a film advance control wheel;
   (b) rewinding means having a driving torque transmitting system for rewinding the film;
   (c) an electric motor operating as a driving torque source for said winding means and said rewinding means;
   (d) first film motion detecting means for detecting rotation of said film advance control wheel in order to display the moving condition of rewinding the film, said wheel being positioned in said driving torque transmitting system of said winding means and being arranged upon operation of said rewinding means to be freed from the transmission from said motor; and
   (e) second film motion detecting means for detecting motion of the film in order to display the moving condition of winding of the film.

2. A camera according to claim 1, wherein said first film motion detecting means detects rotation of a sprocket.

3. A camera according to claim 1, wherein said second film motion detecting means detects rotation of a roller which is driven to rotate by frictional engagement with the film.

4. A camera according to claim 2 or 3, wherein said first and said second film motion detecting means are arranged in coaxial relation to each other.

5. A camera according to claim 1, which constitutes a single lens reflex camera.

6. A camera having a motorized rewinding system, comprising:
   (a) rewinding means having a driving torque transmitting system for rewinding a film;
   (b) an electric motor operating as a driving torque source for said rewinding means;
   (c) first film motion detecting means for detecting motion of the film, said detecting means generating a pulse signal output corresponding to the amount of motion of the film and enabling detection of the condition of film motion;
   (d) second film motion detecting means for detecting motion of said film;
   (e) timer means for measuring a time during which the film is not moved by the pulse signal output of said first film motion detecting means; and
   (f) motor stopping means for stopping said motor when the fact that the film is not moved for a prescribed time is detected by said timer means.

7. A motorized winding and rewinding camera comprising:
   (a) a winding system having driving torque transmitting means for winding up a film including a film advance control wheel;
   (b) a rewinding system having a driving torque transmitting means for rewinding the film;
   (c) an electric motor operable as a driving torque source for said winding system and said rewinding system;
   (d) first film motion detecting means for detecting rotation of said film advance control wheel while rewinding the film, said wheel being positioned in said driving torque transmitting means of said winding system and being arranged upon operation of said rewinding system to be freed from the tranmission from said motor; and
   (e) second film motion detecting means for detecting motion of the film while the film is being wound.

* * * * *